United States Patent
Forbes, Jr. et al.

(10) Patent No.: US 12,444,152 B1
(45) Date of Patent: Oct. 14, 2025

(54) APPLICATION MULTITASKING IN A THREE-DIMENSIONAL ENVIRONMENT

(71) Applicant: Meta Platforms Technologies, LLC, Menlo Park, CA (US)

(72) Inventors: Ronald Omega Forbes, Jr., Seattle, WA (US); Nathan Furtwangler, Kirkland, WA (US); Matthew Luther, Los Gatos, CA (US); Eduardo Alberto Cuervo Laffaye, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 297 days.

(21) Appl. No.: 18/068,102

(22) Filed: Dec. 19, 2022

Related U.S. Application Data

(60) Provisional application No. 63/380,406, filed on Oct. 21, 2022.

(51) Int. Cl.
  *G06T 19/20* (2011.01)
  *G06V 10/74* (2022.01)

(52) U.S. Cl.
  CPC ............ *G06T 19/20* (2013.01); *G06V 10/761* (2022.01); *G06T 2219/2004* (2013.01)

(58) Field of Classification Search
  CPC ............ G06T 19/20; G06T 2219/2004; G06V 10/761
  See application file for complete search history.

(56) References Cited

U.S. PATENT DOCUMENTS 770,149 A    9/1904  Bailey
6,842,175 B1 1/2005  Schmalstieg et al.
(Continued)

FOREIGN PATENT DOCUMENTS

EP   2887322 B1    2/2020
WO   2018235371 A1 12/2018
(Continued)

OTHER PUBLICATIONS

Broitman A., "Learn and Do More with Lens in Google Images," Oct. 25, 2018, Retrieved from the Internet: URL: https://www.blog.google/products/search/learn-and-do-more-lens-google-images/ , 4 pages.

(Continued)

*Primary Examiner* — YuJang Tswei
(74) *Attorney, Agent, or Firm* — Dannon G. Allbee; Potomac Law Group, PLLC

(57) ABSTRACT

Aspects of the present disclosure are directed to application multitasking in a shell with a three-dimensional environment. Implementations immerse a user in a three-dimensional environment via an artificial reality system, such as a display environment for a system shell. The system shell can execute applications (e.g., system shell applications, remoted applications, etc.). An executing application can correspond to a displayed virtual object (e.g., panel). The system shell can concurrently execute two, three, or more applications and the three-dimensional environment can concurrently display two, three, or more corresponding virtual objects that display contents for the executing applications. Implementations of a mode manager can manage a mode for the three-dimensional environment/system shell. Example modes include cooperative mode and exclusive mode. Implementations of cooperative mode permit concurrent display of multiple virtual objects from different applications while the exclusive mode permits display of virtual objects only from the executing application entering exclusive mode.

20 Claims, 13 Drawing Sheets

(56) References Cited

U.S. PATENT DOCUMENTS

| | | |
|---|---|---|
| 7,650,575 B2 | 1/2010 | Cummins et al. |
| 7,701,439 B2 | 4/2010 | Hillis et al. |
| 8,335,991 B2 | 12/2012 | Douceur et al. |
| 8,558,759 B1 | 10/2013 | Prada Gomez et al. |
| 8,947,351 B1 | 2/2015 | Noble |
| 9,055,404 B2 | 6/2015 | Setlur et al. |
| 9,081,177 B2 | 7/2015 | Wong et al. |
| 9,117,274 B2 | 8/2015 | Liao et al. |
| 9,292,089 B1 | 3/2016 | Sadek |
| 9,477,368 B1 | 10/2016 | Filip et al. |
| 9,530,252 B2 | 12/2016 | Poulos et al. |
| 9,817,472 B2 | 11/2017 | Lee et al. |
| 10,127,290 B1 | 11/2018 | Armstrong et al. |
| 10,220,303 B1 | 3/2019 | Schmidt et al. |
| 10,248,284 B2 | 4/2019 | Itani et al. |
| 10,473,935 B1 | 11/2019 | Gribetz et al. |
| 10,477,104 B1 * | 11/2019 | Roessler ............ H04N 23/63 |
| 10,504,277 B1 | 12/2019 | Haitani et al. |
| 10,521,944 B2 | 12/2019 | Sareen et al. |
| 10,713,831 B2 | 7/2020 | Arana et al. |
| 10,796,489 B1 | 10/2020 | Cordes et al. |
| 10,867,450 B2 | 12/2020 | Todeschini |
| 10,909,762 B2 | 2/2021 | Karalis et al. |
| 10,963,144 B2 | 3/2021 | Fox et al. |
| 11,023,096 B2 | 6/2021 | Schneider et al. |
| 11,087,029 B1 | 8/2021 | Satpathy |
| 11,087,529 B2 | 8/2021 | Yeung et al. |
| 11,126,320 B1 | 9/2021 | Thompson et al. |
| 11,132,066 B1 | 9/2021 | Blachly et al. |
| 11,132,827 B2 | 9/2021 | Gladkov et al. |
| 11,176,755 B1 | 11/2021 | Tichenor et al. |
| 11,238,664 B1 | 2/2022 | Tavakoli et al. |
| 11,947,862 B1 | 4/2024 | Lindo et al. |
| 12,008,717 B2 | 6/2024 | Noris et al. |
| 12,236,540 B2 | 2/2025 | Estany Rodriguez et al. |
| 2008/0089587 A1 | 4/2008 | Kim et al. |
| 2009/0313299 A1 | 12/2009 | Bonev et al. |
| 2010/0251177 A1 | 9/2010 | Geppert et al. |
| 2010/0306716 A1 | 12/2010 | Perez |
| 2011/0267265 A1 | 11/2011 | Stinson |
| 2012/0069168 A1 | 3/2012 | Huang et al. |
| 2012/0143358 A1 | 6/2012 | Adams et al. |
| 2012/0188279 A1 | 7/2012 | Demaine |
| 2012/0206345 A1 | 8/2012 | Langridge |
| 2012/0275686 A1 | 11/2012 | Wilson et al. |
| 2012/0293544 A1 | 11/2012 | Miyamoto et al. |
| 2013/0051615 A1 | 2/2013 | Lim et al. |
| 2013/0063345 A1 | 3/2013 | Maeda |
| 2013/0069860 A1 | 3/2013 | Davidson |
| 2013/0117688 A1 | 5/2013 | Yerli |
| 2013/0125066 A1 | 5/2013 | Klein et al. |
| 2013/0141419 A1 | 6/2013 | Mount et al. |
| 2013/0147793 A1 | 6/2013 | Jeon et al. |
| 2013/0169682 A1 | 7/2013 | Novak et al. |
| 2013/0265220 A1 | 10/2013 | Fleischmann et al. |
| 2014/0125598 A1 | 5/2014 | Cheng et al. |
| 2014/0149901 A1 | 5/2014 | Hunter |
| 2014/0236996 A1 | 8/2014 | Masuko et al. |
| 2014/0268065 A1 | 9/2014 | Ishikawa et al. |
| 2014/0357366 A1 | 12/2014 | Koganezawa et al. |
| 2014/0375683 A1 | 12/2014 | Salter et al. |
| 2014/0375691 A1 | 12/2014 | Kasahara |
| 2014/0378022 A1 | 12/2014 | Muthyala et al. |
| 2015/0015504 A1 | 1/2015 | Lee et al. |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0077592 A1 | 3/2015 | Fahey |
| 2015/0094142 A1 | 4/2015 | Stafford |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0253862 A1 | 9/2015 | Seo et al. |
| 2015/0261659 A1 | 9/2015 | Bader et al. |
| 2015/0356774 A1 | 12/2015 | Gal et al. |
| 2016/0026253 A1 | 1/2016 | Bradski et al. |
| 2016/0093108 A1 | 3/2016 | Mao et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0173359 A1 | 6/2016 | Brenner et al. |
| 2016/0180590 A1 | 6/2016 | Kamhi et al. |
| 2016/0378291 A1 | 12/2016 | Pokrzywka |
| 2017/0060230 A1 | 3/2017 | Faaborg et al. |
| 2017/0075420 A1 | 3/2017 | Yu et al. |
| 2017/0076500 A1 | 3/2017 | Maggiore et al. |
| 2017/0109936 A1 | 4/2017 | Powderly et al. |
| 2017/0139478 A1 | 5/2017 | Jeon et al. |
| 2017/0192513 A1 | 7/2017 | Karmon et al. |
| 2017/0206691 A1 | 7/2017 | Harrises et al. |
| 2017/0214782 A1 | 7/2017 | Brinda |
| 2017/0242675 A1 | 8/2017 | Deshmukh |
| 2017/0243465 A1 | 8/2017 | Bourne, Jr. et al. |
| 2017/0262063 A1 | 9/2017 | Blenessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0311129 A1 | 10/2017 | Lopez-Uricoechea et al. |
| 2017/0323488 A1 | 11/2017 | Mott et al. |
| 2017/0364198 A1 | 12/2017 | Yoganandan et al. |
| 2017/0372225 A1 | 12/2017 | Foresti |
| 2018/0005429 A1 | 1/2018 | Osman et al. |
| 2018/0059901 A1 | 3/2018 | Gullicksen |
| 2018/0075659 A1 | 3/2018 | Browy et al. |
| 2018/0091304 A1 | 3/2018 | Brook et al. |
| 2018/0095616 A1 | 4/2018 | Valdivia et al. |
| 2018/0107278 A1 | 4/2018 | Goel et al. |
| 2018/0113599 A1 | 4/2018 | Yin |
| 2018/0189647 A1 | 7/2018 | Calvo et al. |
| 2018/0288391 A1 | 10/2018 | Lee et al. |
| 2018/0293802 A1 | 10/2018 | Hendricks et al. |
| 2018/0300557 A1 | 10/2018 | Rodenas et al. |
| 2018/0307303 A1 | 10/2018 | Powderly et al. |
| 2018/0322701 A1 | 11/2018 | Pahud et al. |
| 2018/0329718 A1 | 11/2018 | Klein et al. |
| 2018/0335925 A1 | 11/2018 | Hsiao et al. |
| 2018/0342106 A1 | 11/2018 | Rosado |
| 2018/0357780 A1 | 12/2018 | Young et al. |
| 2019/0005724 A1 | 1/2019 | Pahud et al. |
| 2019/0094981 A1 | 3/2019 | Bradski et al. |
| 2019/0107894 A1 | 4/2019 | Hebbalaguppe et al. |
| 2019/0114061 A1 | 4/2019 | Daniels et al. |
| 2019/0155481 A1 | 5/2019 | Diverdi et al. |
| 2019/0172262 A1 | 6/2019 | McHugh et al. |
| 2019/0197785 A1 * | 6/2019 | Tate-Gans ............ G06T 19/006 |
| 2019/0213792 A1 | 7/2019 | Jakubzak et al. |
| 2019/0236842 A1 | 8/2019 | Bennett et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0279426 A1 | 9/2019 | Musunuri et al. |
| 2019/0279430 A1 | 9/2019 | Todeschini |
| 2019/0286231 A1 | 9/2019 | Burns et al. |
| 2019/0317965 A1 | 10/2019 | Remis et al. |
| 2019/0340833 A1 | 11/2019 | Furtwangler et al. |
| 2019/0362562 A1 | 11/2019 | Benson |
| 2019/0369391 A1 | 12/2019 | Cordesses et al. |
| 2019/0377406 A1 | 12/2019 | Steptoe et al. |
| 2019/0377416 A1 | 12/2019 | Alexander |
| 2020/0066047 A1 | 2/2020 | Karalis et al. |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0174584 A1 | 6/2020 | Schliemann et al. |
| 2020/0210127 A1 | 7/2020 | Browy |
| 2020/0218423 A1 | 7/2020 | Ohashi |
| 2020/0219319 A1 | 7/2020 | Lashmar et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0226820 A1 | 7/2020 | Stachniak et al. |

(56) References Cited

U.S. PATENT DOCUMENTS

| | | | |
|---|---|---|---|
| 2020/0285761 | A1 | 9/2020 | Buck et al. |
| 2020/0285977 | A1 | 9/2020 | Brebner |
| 2020/0351273 | A1 | 11/2020 | Thomas |
| 2020/0363924 | A1 | 11/2020 | Flexman et al. |
| 2020/0363930 | A1 | 11/2020 | Srinivasan et al. |
| 2021/0012113 | A1 | 1/2021 | Petill et al. |
| 2021/0014408 | A1 | 1/2021 | Timonen et al. |
| 2021/0097768 | A1 | 4/2021 | Malia et al. |
| 2021/0104100 | A1 | 4/2021 | Whitney et al. |
| 2021/0192856 | A1 | 6/2021 | Lee |
| 2021/0256769 | A1 | 8/2021 | Bailey et al. |
| 2021/0272375 | A1 | 9/2021 | Lashmar et al. |
| 2021/0295602 | A1 | 9/2021 | Scapel et al. |
| 2021/0306238 | A1 | 9/2021 | Cheng et al. |
| 2021/0329044 | A1* | 10/2021 | Sommer ............... H04L 65/403 |
| 2021/0358201 | A1 | 11/2021 | Cady et al. |
| 2021/0390765 | A1 | 12/2021 | Laaksonen et al. |
| 2022/0084279 | A1 | 3/2022 | Lindmeier et al. |
| 2022/0091722 | A1 | 3/2022 | Faulkner et al. |
| 2022/0101612 | A1 | 3/2022 | Palangie et al. |
| 2022/0121344 | A1 | 4/2022 | Pastrana Vicente et al. |
| 2022/0139052 | A1 | 5/2022 | Tavakoli et al. |
| 2022/0214743 | A1 | 7/2022 | Dascola et al. |
| 2022/0253125 | A1 | 8/2022 | Wallen et al. |
| 2022/0254120 | A1 | 8/2022 | Berliner et al. |
| 2022/0269888 | A1 | 8/2022 | Stoeva et al. |
| 2022/0326837 | A1* | 10/2022 | Dessero ............... G06T 15/005 |
| 2022/0326967 | A1 | 10/2022 | Khan et al. |
| 2022/0335694 | A1 | 10/2022 | Bouazizi et al. |
| 2022/0392093 | A1 | 12/2022 | Poulad et al. |
| 2023/0050933 | A1 | 2/2023 | Xiao et al. |
| 2023/0092282 | A1* | 3/2023 | Boesel ................ G06T 19/20 715/849 |
| 2023/0206571 | A1 | 6/2023 | Darling et al. |
| 2023/0237192 | A1 | 7/2023 | Kahan et al. |
| 2023/0260233 | A1 | 8/2023 | Goncalves et al. |
| 2024/0152244 | A1 | 5/2024 | Dedonato et al. |
| 2024/0152245 | A1 | 5/2024 | Broughton et al. |
| 2024/0176839 | A1 | 5/2024 | Chrysanthou |
| 2024/0303932 | A1 | 9/2024 | Noris et al. |
| 2024/0331331 | A1 | 10/2024 | Goncalves et al. |

FOREIGN PATENT DOCUMENTS

| | | | |
|---|---|---|---|
| WO | 2020226832 | A1 | 11/2020 |
| WO | 2022055822 | A1 | 3/2022 |
| WO | 2024085996 | A1 | 4/2024 |

OTHER PUBLICATIONS

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Search Report and Written Opinion for International Application No. PCT/US2020/051763, mailed Feb. 3, 2021, 11 Pages.

International Search Report and Written Opinion for International Application No. PCT/US2022/032288, mailed Sep. 16, 2022, 11 pages.

Invitation to Pay Additional Fees for International Application No. PCT/US2021/044098, Nov. 3, 2021, 15 pages.

Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Melnick K., "Google Rolls out New AR Features for Its Lens APP," May 28, 2019, Retrieved from the Internet: URL: https://vrscout.com/news/new-ar-features-google-lens/ , 3 pages.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et al., "EyePointing: A Gaze-Based Selection Technique," Proceedings of Mensch and Computer, Hamburg, Germany, Sep. 8-11, 2019, pp. 719-723.

"Unity Gets Toolkit for Common AR/VR Interactions," Unity XR interaction Toolkit Preview [Online], Dec. 19, 2019 [Retrieved on Apr. 7, 2020], 1 page, Retrieved from the Internet: URL: http://youtu.be/ZPhv4qmT9EQ.

Game Ui Examples: "[VR] Half Life Alyx Menu/Settings/UI," Feb. 27, 2021, 2 pages, retrieved from the Internet URL: https://www.youtube.com/watch?v=-iNR-J2whJQ&t=7s.

International Search Report and Written Opinion for International Application No. PCT/US2023/033526, mailed Dec. 1, 2023, 13 pages.

* cited by examiner

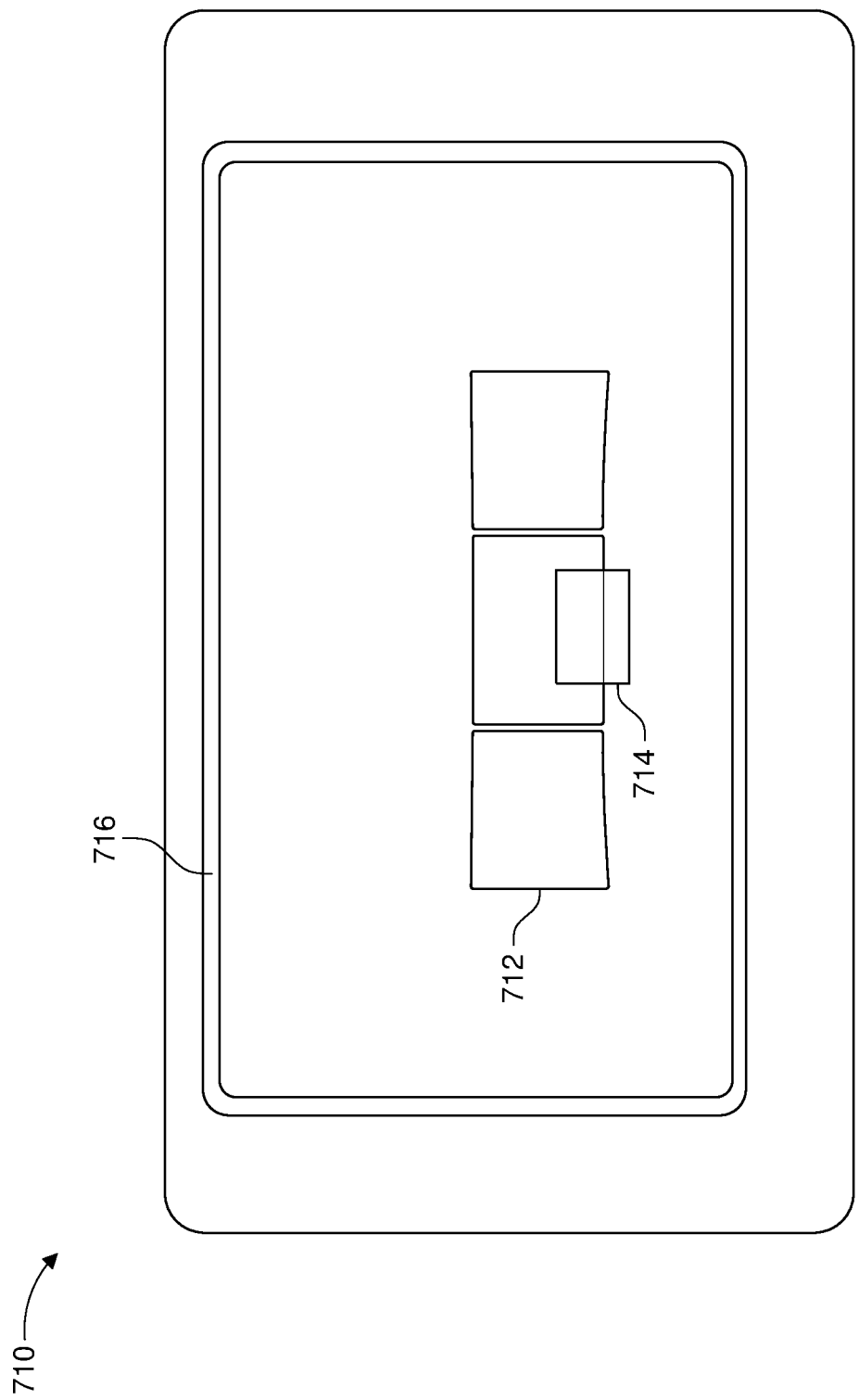

APPLICATION MULTITASKING IN A THREE-DIMENSIONAL ENVIRONMENT

CROSS-REFERENCE TO RELATED APPLICATIONS

This application claims priority to U.S. Provisional Patent Application No. 63/380,406, titled "Application Multitasking in A Three-Dimensional Environment," filed Oct. 21, 2022, which is herein incorporated by reference in its entirety.

TECHNICAL FIELD

The present disclosure is directed to application multitasking in a shell with a three-dimensional environment.

BACKGROUND

Artificial reality systems have grown in popularity and this trend is expected to accelerate. Immersive artificial reality environments can provide unique experiences and support virtual social interactions among users. However, user interactions with executing applications in a three-dimensional environment often follow rigid conventions. For example, XR systems often omit concurrent execution and display of multiple executing applications. In addition, switching between multiple applications often involves a manual user workflow with several steps, such as terminating execution of a current application before executing a new application.

BRIEF DESCRIPTION OF THE DRAWINGS

FIG. 7B is a diagram of a three-dimensional environment illustrating multiple display locations.

The techniques introduced here may be better understood by referring to the following Detailed Description in conjunction with the accompanying drawings, in which like reference numerals indicate identical or functionally similar elements.

DETAILED DESCRIPTION

Figure 1:
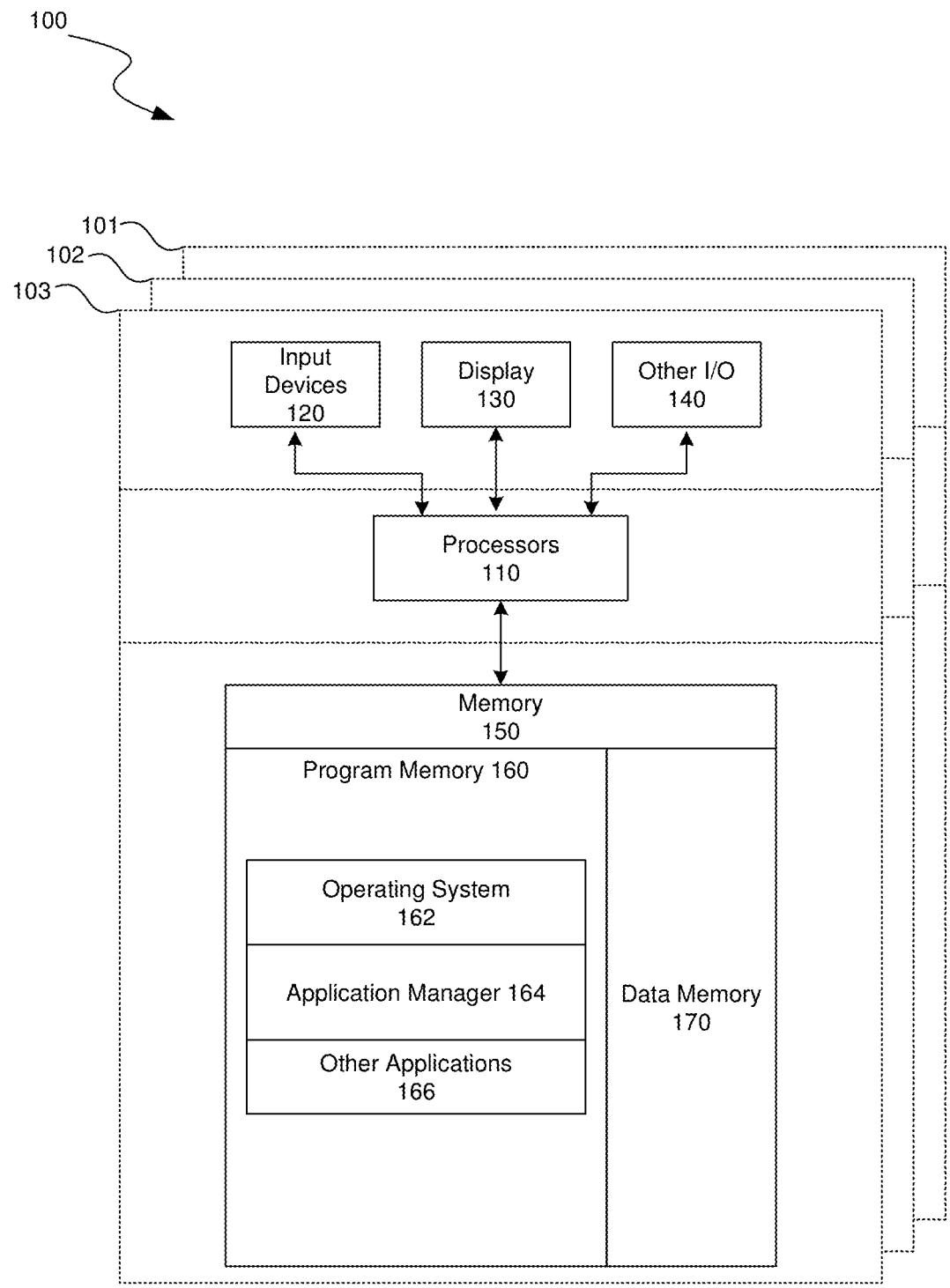
FIG. 1 is a block diagram illustrating an overview of devices on which some implementations of the present technology can operate.

Aspects of the present disclosure are directed to application multitasking in a shell with a three-dimensional environment. Implementations immerse a user in a three-dimensional environment via an artificial reality system. The three-dimensional environment can be the display environment for a system shell. Implementations of the system shell execute applications (e.g., system shell applications and applications remote from the system shell). For example, an executing application can correspond to a two-dimensional virtual object (e.g., panel) displayed in the three-dimensional environment. In some implementations, the system shell can concurrently execute two, three, or more applications and the three-dimensional environment can concurrently display two, three, or more corresponding virtual objects that display contents for the executing applications. The concurrently displayed virtual objects can be side-by-side panel displays in some implementations. Example applications include web browsers, music players, video players, social media applications, messaging or other communication applications, third-party applications, streaming/casting applications, a content library application, or any other suitable application.

Virtual object displays in the three-dimensional environment can comprise display components for executing applications. For example, the content for an executing application is displayed in its corresponding virtual object. Virtual objects can display a webpage for a browser application, an interface for playing music or a video, messages with other users, or any other suitable content. The user can interact with executing applications using their virtual object displays, such as via hand-held controller input (e.g., sensed motion, button presses, etc.), sensed user motion (e.g., virtual hands), or any other suitable user input.

In some implementations, a near-field (e.g., predefined region or volume of the three-dimensional environment) can comprise a set of nodes that can each host a virtual object in cooperative mode. The near-field can comprise the surface of a cylinder that surrounds the user (or a portion of the cylindrical surface) such that that the near-field is a first distance from the user. In some implementations, the nodes can be side-by-side on the near-field so that when the nodes host virtual objects, they are displayed side-by-side. For example, the near-field can display two, three, or more side-by-side two-dimensional virtual objects (e.g., panels) at a first distance from the user, and each virtual object can display contents for a concurrently executing application. In some implementations, when a given application begins executing (e.g., via user input, or any other suitable trigger) or a background application is restored, the given application can be assigned to one of the unassigned nodes of the near-field. A user can also select a virtual object that corresponds to an executing application (e.g., grab a virtual object via user input, such as a pinch) and position the virtual object over an unassigned node at the near-field to assign the virtual object/executing application to the node.

Implementations of the system shell can store the state of executing applications and the shell state of their corresponding two-dimensional virtual objects. For example, when an application is transitioned to background status, such as when an exclusive mode is entered, or the system shell is transitioned to inactive (e.g., when a user initiates a XR application that triggers display of a new XR environment, ends a user session with the XR system, etc.), the application state of executing application(s) and the shell state (e.g., position, size, etc.) of their corresponding two-dimensional virtual object(s) can be stored. The state storage responsibilities can be divided among the system shell and the individual applications. For example, the shell state stored by the system shell can include: size and position (e.g., within the three-dimensional environment) of the corresponding two-dimensional virtual object(s), application specific display parameters (e.g., tab orientation, relevant websites/webpages, etc.), and any other suitable state parameter(s) that initialize an application. State stored by the individual applications can include: specific state of content displayed at the time the application is closed (e.g., open tab, scroll position, open webpage, open messages in a communication application, etc.), and any other suitable application state parameter.

When the application(s) are restored (e.g., exclusive mode is terminated, the system shell returns to an active state, etc.), implementations of the system shell can restore/initialize display of virtual objects for the application(s) according to the system shell's stored shell state (e.g., position and size of the virtual object, initialization parameters for the application, etc.) and the application itself can restore the content displayed at the virtual object(s) according to the application's stored state. In combination, this state save and restoration workflow provides the user a seamless experience. For example, when an executing application is transitioned into the background having a given state (e.g., virtual object position and size, content displayed in the virtual object, etc.), the application can be restored in the same given state (without any additional interaction with or management by the user) upon transitioning into active execution again. Similarly, when a system shell is transitioned to inactive (e.g., its three-dimensional virtual environment is no longer displayed), a given state for each of its executing applications can be stored. Upon reactivation of the system shell (e.g., redisplay of the three-dimensional environment), each application can be restored to its given state to provide a seamless restoration of the state for the entire system shell.

Implementations of a mode manager can manage a mode for the three-dimensional environment/system shell. Example modes include cooperative mode and exclusive mode. Implementations of cooperative mode permit concurrent execution of multiple applications and display of multiple virtual objects, such as multiple panels in a near-field that display the contents of multiple executing applications. In some examples, the mode manager can initiate exclusive mode for an executing application, for example according to user input, based on a request from the application, or in any other suitable manner. Implementations of the exclusive mode permit display of virtual objects only from the executing application entering exclusive mode, for example at a location in the three-dimensional environment closer to the user than the near-field region, or at any other suitable location. When exclusive mode is initiated, executing applications other than the application entering exclusive mode are transitioned to the background and their states are stored. In addition, the virtual object displays for these applications are no longer displayed until exclusive mode is exited. In some implementations, when a given application enters exclusive mode, applications other than the given application are prevented from displayed world-locked content (e.g., content locked to a real-world location while displayed in the XR environment).

Implementations of the three-dimensional environment include a theater screen at a far-field region or volume. For example, the far-field region can be a cylindrical surface (or portion of a cylindrical surface) that is further from the user than the near-field. The theater screen can display content for any suitable application assigned to the theater screen. In some implementations, the theater screen can be active in cooperative mode or in exclusive mode. For example, the theater screen can display a video while a user interacts with other executing application(s) via their corresponding virtual object(s). In some implementations, a theater screen can be shared among multiple users. For example, a video can be cast to a theater screen that is simultaneously displayed to multiple users via multiple XR systems. In this example, each user can be immersed in a three-dimensional environment (e.g., that corresponds to a system shell), and the theater screen can be displayed in the far-field region for each user. In other examples, the theater screen can simultaneously display video to the multiple users in any other suitable manner.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

The shell component of conventional XR systems fails to support multi-application functionality. For example, XR systems often omit concurrent execution and display of multiple executing applications. In addition, switching between multiple applications often involves a manual user workflow with several steps, such as terminating execution of a current application before executing a new application.

Implementations provide a shell XR environment and system shell that executes applications (e.g., system shell applications and applications remote from the system shell). For example, an executing application can correspond to a two-dimensional virtual object displayed in the XR environment. The system shell can concurrently execute two, three, or more applications and the XR environment can concurrently display two, three, or more corresponding virtual objects that display contents for the executing applications. The concurrently displayed virtual objects can be side-by-side panel displays in some implementations.

In addition, implementations of the system shell can store the state of executing applications and the shell state of their corresponding two-dimensional virtual objects. For example, when an executing application is transitioned to background status, the application state of the executing application and the shell state of its corresponding two-dimensional virtual object can be stored. When the application transitions back to active execution, implementations of the system shell can restore/initialize display of virtual object for the application according to the system shell's stored shell state and the application can restore the content displayed at the virtual object according to the application's stored state. Accordingly, implementations provide mechanisms for concurrent execution of applications in the shell environment and efficient switching between executing applications.

Several implementations are discussed below in more detail in reference to the figures. FIG. 1 is a block diagram illustrating an overview of devices on which some implementations of the disclosed technology can operate. The devices can comprise hardware components of a computing system 100 that provide application multitasking in a shell with a three-dimensional environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, application manager 164, and other application programs 166. Memory 150 can also include data memory 170 that can include, e.g., virtual object data, application data, environment or application state data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
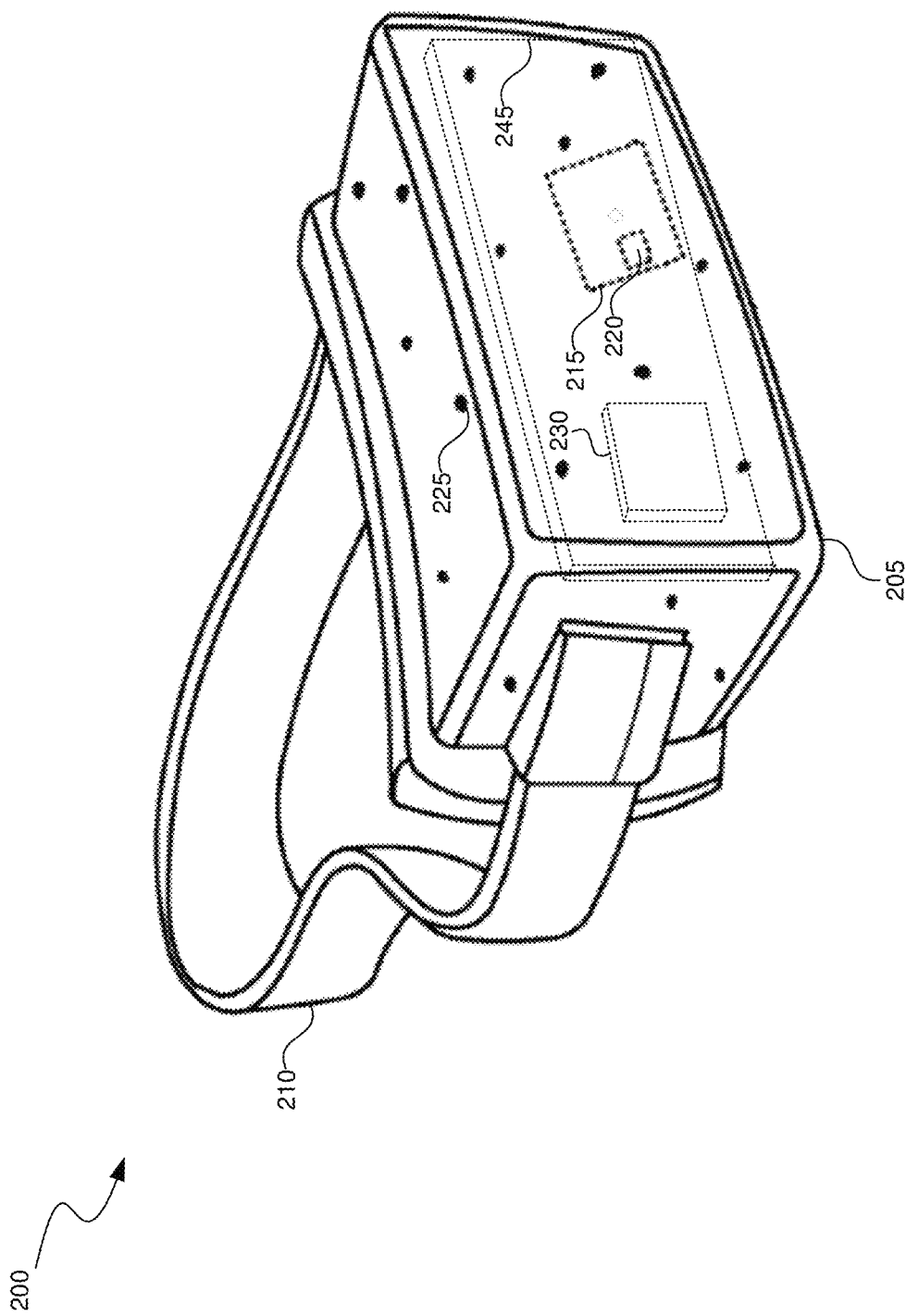
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
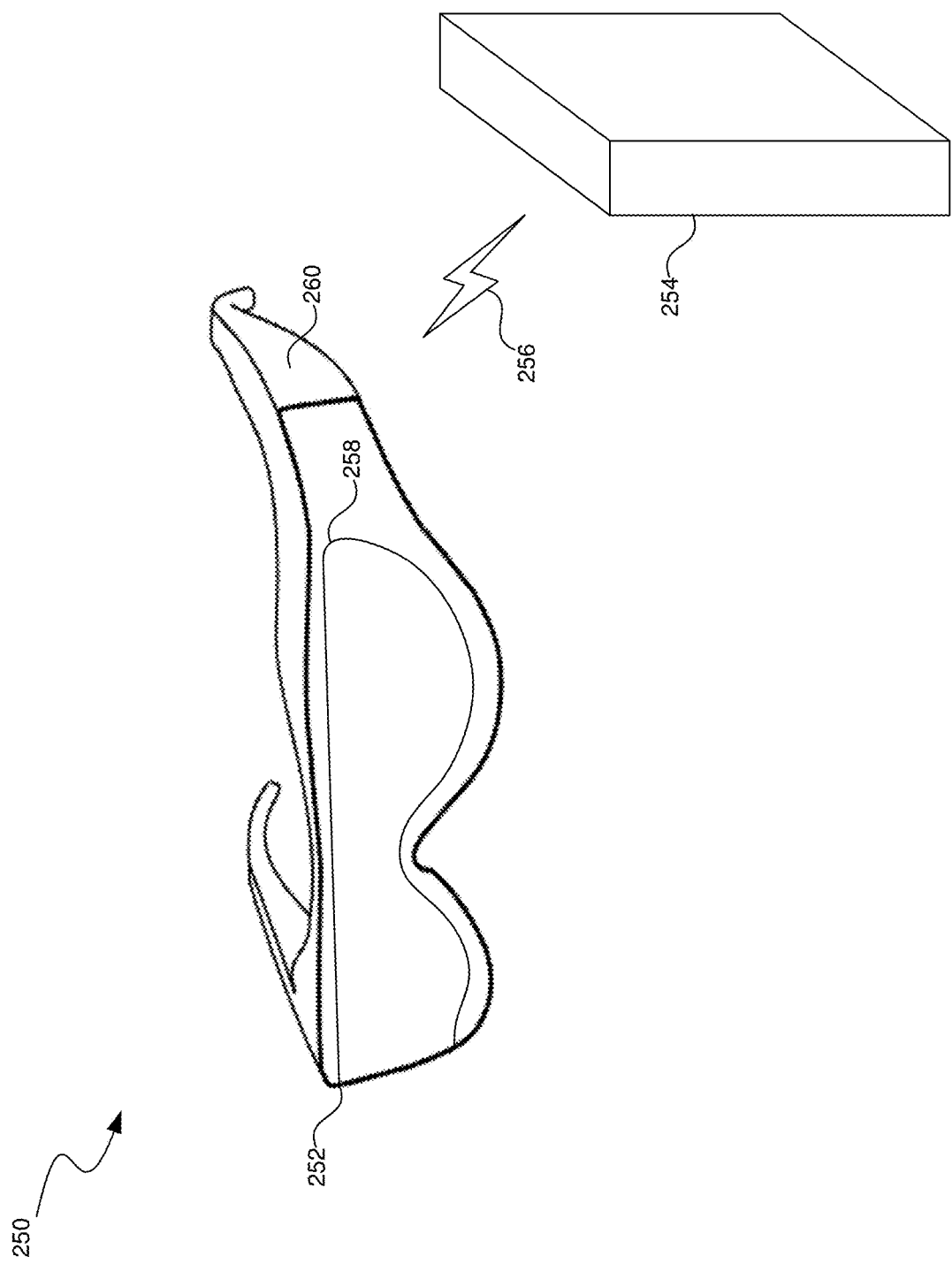
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
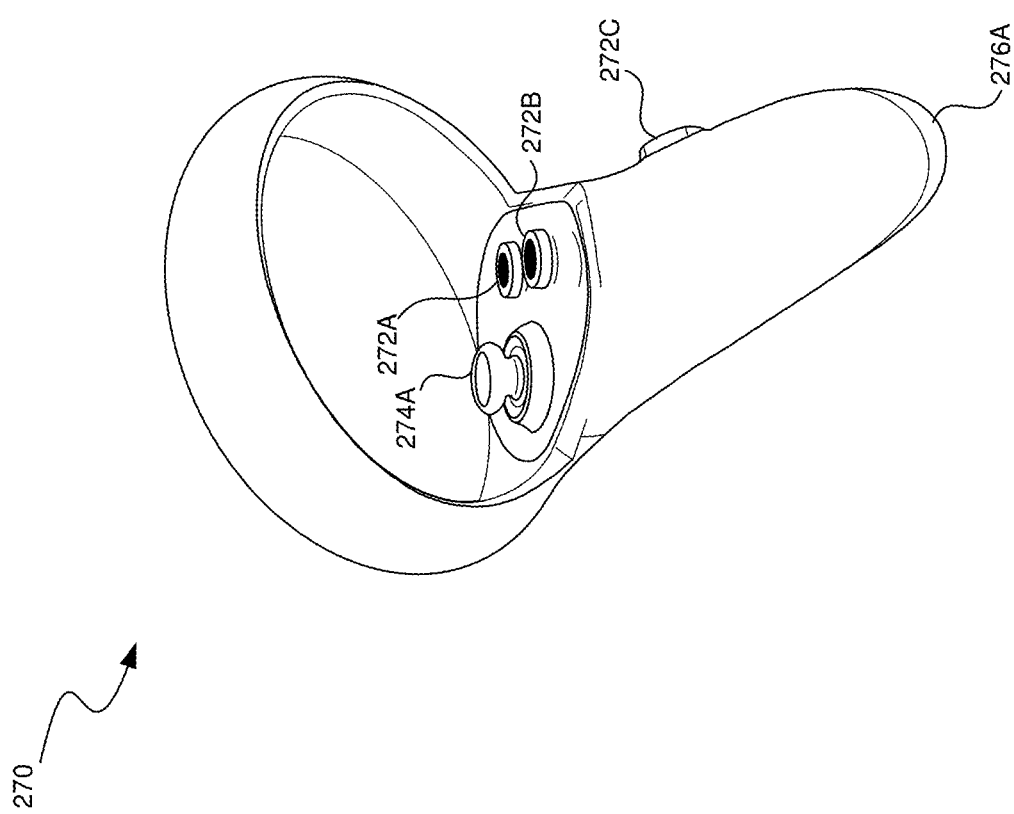
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
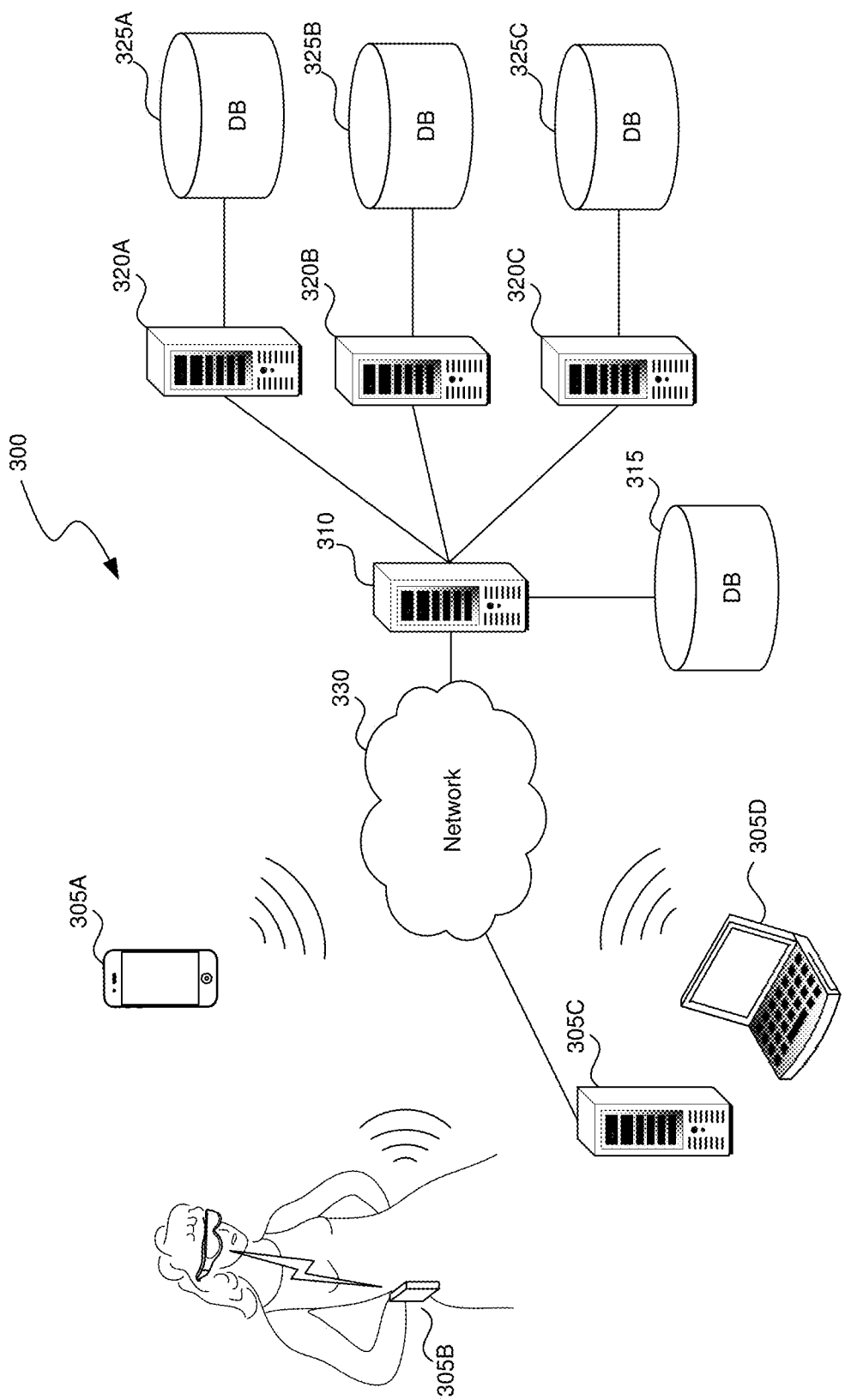
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
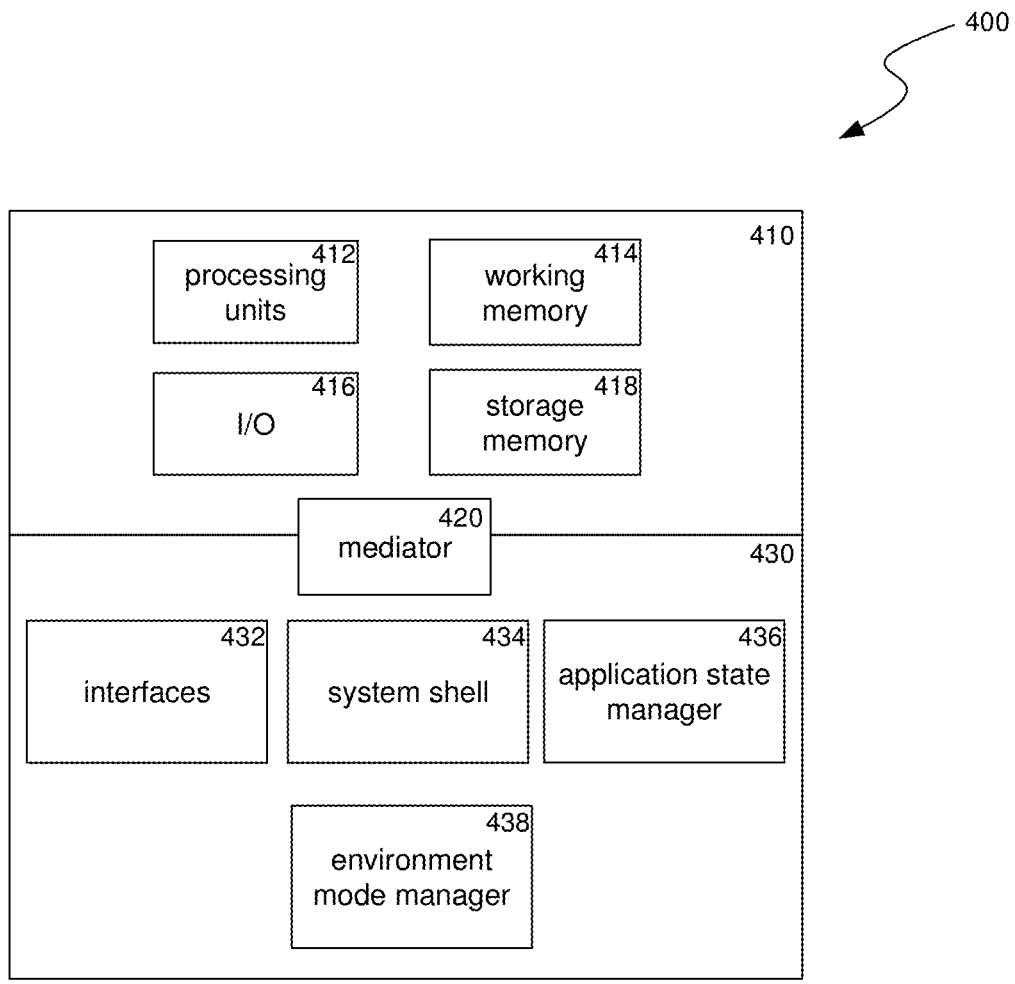
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for controlling an indicator by combining signals from multiple sensors. Specialized components 430 can include system shell 434, application state manager 436, environment mode manager 438, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

System shell 434 can manage the software components of a XR system, such as system display components, software functionality for system display components, and interactions with launched applications. For example, system shell 434 can be a shell environment in which applications are executed, such as shell applications or applications remote from the shell. Example applications include web browsers, music players, video players, social media applications, messaging web browsers, music players, video players, social media applications, messaging or other communication applications, third-party applications, streaming/casting applications, a content library application, or any other suitable application.

Implementations of system shell 434 can interact with the applications executing at the XR system to manage visual displays for the applications, such as two-dimensional virtual object displays (e.g., panels). System shell 434 can manage positioning and sizing of the virtual object displays and allocate portions of display area/volume to the executing applications. Implementations of system shell 434 can also restore a state for backgrounded/suspended application(s)/virtual object(s) using the saved state(s) managed by state manager 436. In some implementations, system shell 434 can comprise several units of executing software in combination. Additional details on system shell 434 are provided below in relation to FIGS. 5, 6, 7, 8, and blocks 902, 904, 906, 908, 910, and 912 of FIG. 9.

Application state manager 436 can save a shell state for applications, such as positioning and location for the virtual object display component of the applications. For example, when an application is transitioned to background status, such as when an exclusive mode is entered, or the system shell is transitioned to inactive (e.g., when a user initiates a XR application that triggers display of a new XR environment), the application state of executing application(s) and the shell state (e.g., position, size, etc.) of their corresponding two-dimensional virtual object(s) can be stored. The state storage responsibilities can be divided among application state manager 436 and the individual applications.

For example, application state manager 436 can store the shell state for an application, including: size and position (e.g., within the three-dimensional environment) of the corresponding two-dimensional virtual object(s), application specific display parameters (e.g., tab orientation, relevant websites/webpages, etc.), and any other suitable state parameter(s) that initialize an application. State stored by the individual applications can include: specific state of content displayed at the time the application is closed (e.g., open tab, scroll position, open webpage, open messages in a communication application, etc.), and any other suitable application state parameter. When system shell 434 restores an application with a saved state, the application's shell state stored by application state manager 436 is used to restore the state of the application's virtual object (e.g., position and size of the virtual object, initialization parameters for the application, etc.) and the application itself can restore the content displayed by the restored virtual object according to the application's stored state.

Environment mode manager 438 can manage a mode for the three-dimensional environment/system shell 434. Example modes include cooperative mode and exclusive mode. Implementations of cooperative mode permit concurrent execution of multiple applications and display of multiple virtual objects, such as multiple panels in a near-field relative to the user that display the contents of multiple executing applications. In some examples, mode manager 438 can initiate exclusive mode for an executing application, for example according to user input, based on a request from the application, or in any other suitable manner. Implementations of the exclusive mode permit display of virtual objects only from the executing application entering exclusive mode. When exclusive mode is initiated, executing applications other than the application entering exclusive mode are transitioned to the background and their state(s) are stored. In addition, the virtual object displays for these applications are no longer displayed until exclusive mode is exited. Additional details on environment mode manager 438 are provided below in relation to blocks 906, 908, and 910 of FIG. 9.

Implementations of the system shell and the applications that execute at the system shell can manage a lifecycle for applications. Example lifecycle stages for an application running at the system shell can include: inactive, minimized, unfocused, focused, and exclusive. An application at the exclusive stage can be operating in exclusive mode at the system shell/in the three-dimensional environment of the shell. An application in the focused stage can be one of several concurrently executing applications operating in cooperative mode that has user input priority. For example, a concurrently executing application can be focused when the user is interacting with the application's virtual object display component or the last user interaction was with the application's virtual object display component. In other examples, an application can gain focus when it is launched, restored, or in any other suitable manner.

Application(s) in the unfocused stage can be one, two, or more concurrently executing application(s) operating in cooperative mode that do not have user input priority. For example, when three applications are concurrently executing in a system shell, two can be unfocused (e.g., without user input priority) and one can be focused. In some implementations, unfocused applications continue to execute at the system shell (e.g., are not backgrounded or suspended) and their content continues to be displayed at their corresponding virtual object displays.

Application(s) in the minimized stage can be backgrounded or suspended applications that comprise a stored state (e.g., shell state and application state) so that the application(s) can be restored (e.g., to a state at the time the application was minimized). In some implementations, minimized applications are not executing at the system shell and do not comprise a corresponding virtual object display. Applications in an inactive state are applications that are not executing and do not comprise a stored state. When launched, inactive applications create a new application session (rather than restoring to a stored state).

In some implementations, during cooperative mode, when an application is launched, restored from a stored state, or selected by a user (e.g., via user input) the application is put into focus. For example, the application will gain focus (e.g., input priority) and a previous application that had focus will lose focus. In some implementations, a first application can launch a second application, and the launched second application gains focus while the first application loses focus. In some implementations, the system shell can automatically minimize one or more defocused applications to conserve system resources. Because shell (e.g., virtual object position and/or size) and application state are saved during minimization, the user does not risk loss of state when the system shell minimizes a defocused application.

Figure 5:
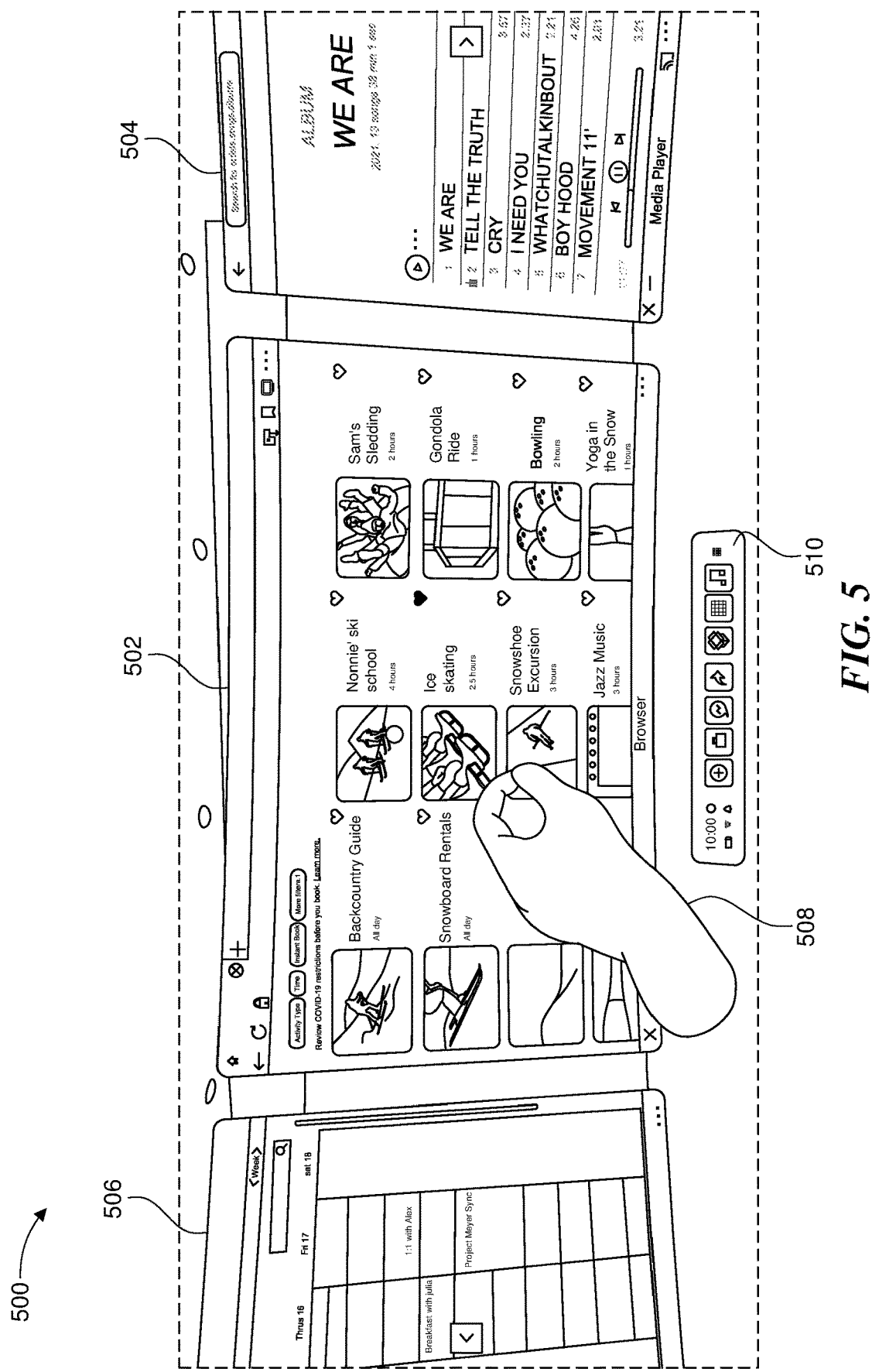
FIG. 5 is a diagram of a three-dimensional environment for a system shell with concurrently executing applications.

FIG. 5 is a diagram of a three-dimensional environment for a system shell with concurrently executing applications. Environment 500 includes virtual objects 502, 504, and 506, virtual hand 508, and menu 510. In some implementations, environment 500 can be a three-dimensional environment for a system shell. Environment 500 (and the system shell) can be operating in cooperative mode. For example, virtual objects 502, 504, and 506 can be two-dimensional virtual objects (e.g., panels) assigned to nodes at the near-field that each correspond to a different executing application. Virtual hand 508 can be a user presence in environment 500 controlled by tracked user movement (e.g., hand movement, controller movement, etc.). In environment 500, virtual hand 508 is interacting with virtual object 502. Accordingly virtual object 502 and its corresponding executing application are in focus (e.g., have user input priority) while virtual objects 504 and 506 and their corresponding executing applications are unfocused (e.g., executing with display components, lack of user input priority).

Menu 510 can comprise a listing of the focused application, unfocused applications, minimized applications, applications available for launch, recently used applications, any other suitable listing of applications, or any combination thereof. In some implementations, menu 510 can be used to launch applications, restore a minimized application to executing/unfocused status, enter exclusive mode for an application, or for any other suitable purpose.

Figure 6A:
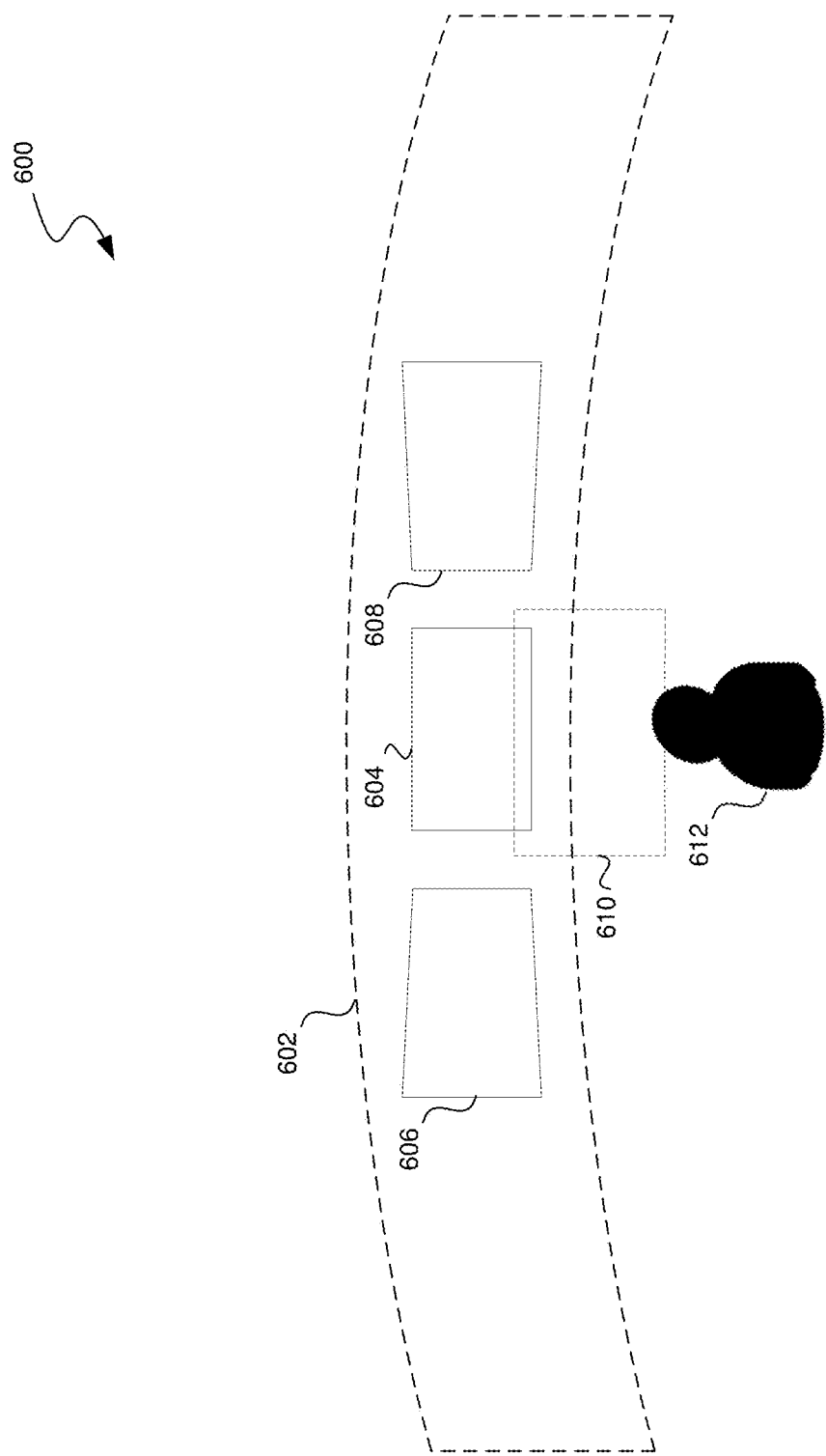
FIGS. 6A and 6B are diagrams of three-dimensional environments for a system shell with multiple virtual object displays.
Figure 6B:
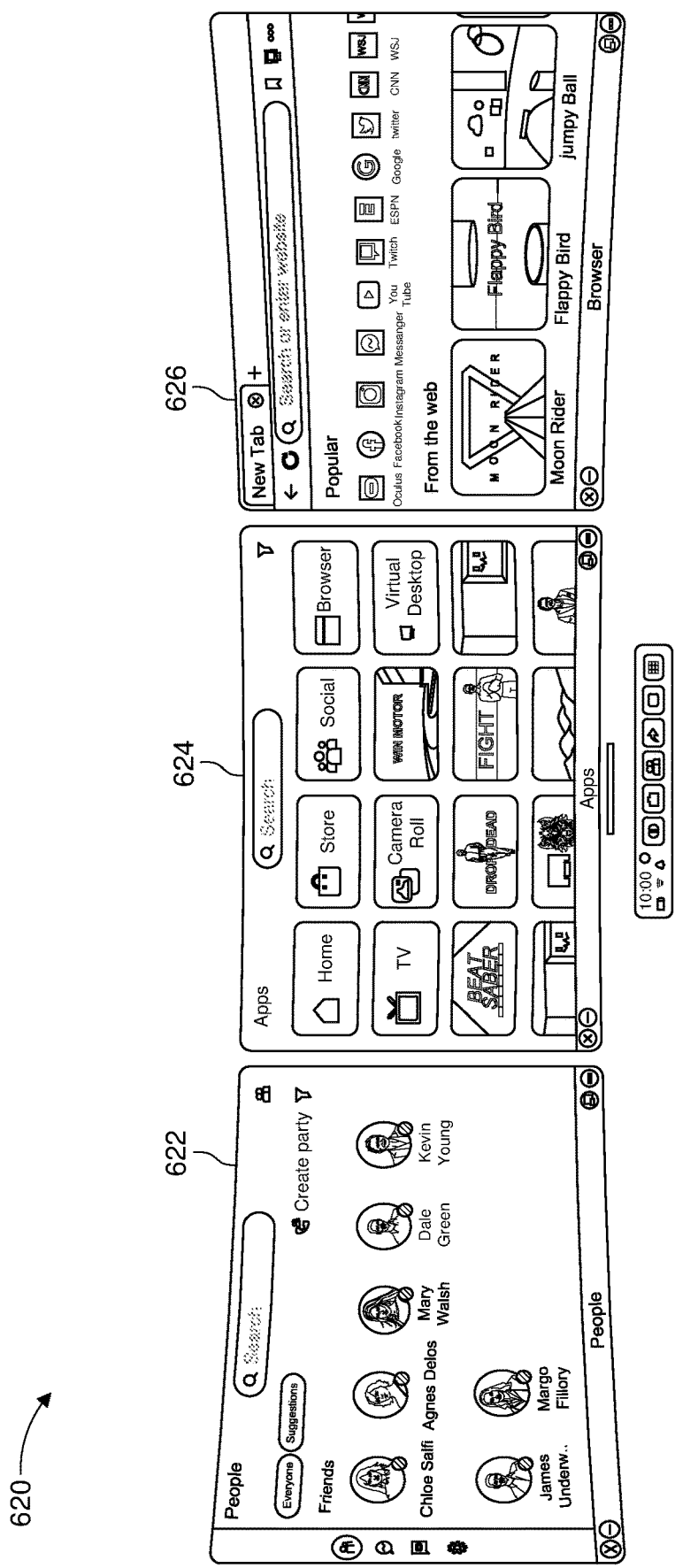

FIGS. 6A and 6B are diagrams of three-dimensional environments for a system shell with multiple virtual object displays. Environment 600 of FIG. 6A includes field 602, virtual objects 604, 606, and 608, exclusive field 610, and user 612. When environment 600 and the system shell are in cooperative mode, multiple applications can be concurrently running that each correspond to one or virtual objects 604, 606, and 608. Field 602 can be a cylindrical surface a distance away from user 612 (e.g., 2 meters, 4 meters, etc.) with node points assignable to virtual objects, such as a near-field. For example, virtual objects 604, 606, and 608 are each assigned to a node of field 602.

Environment 620 of FIG. 6B includes virtual objects 622, 624, and 626. Environment 620 can be similar to environment 500 of FIG. 5, where concurrently executing applications can each correspond to one of virtual objects 622, 624, and 626. For example, virtual objects 622, 624, and 626 can each display the content for an executing application.

Returning to environment 600 of FIGS. 6A, in some implementations environment 600 can transition to exclusive mode, for example in response to user input that transitions one of the executing applications into exclusive mode, when an application requests exclusive mode, or in any other suitable manner. Exclusive field 610 can be a field within environment 600 closer to user 612 than the field 602 in which a virtual object (e.g., two-dimensional panel) can be displayed, such as a virtual object that corresponds to the application running in exclusive mode. In this example, the display of virtual objects 604, 606, and 608 can be selectively removed from environment 600 such that only the virtual object that corresponds the application executing in exclusive mode remains. This virtual object can be displayed at any other suitable location other than exclusive field 610.

In some implementation's, an application operating in exclusive mode displays a three-dimensional XR environment to user 612. For example, prior to exclusive mode, the three-dimensional XR environment displayed to user 612 can be a shell XR environment. In exclusive mode, the shell XR environment can be replaced by an application XR environment (e.g., XR environment provided by the application operating in exclusive mode). The content displayed throughout the XR environment can include multiple virtual objects, a sky box, background, lighting, filters, augments, and any other suitable content. In some implementations, the application operating in exclusive mode can be an immersive gaming application, and the content can be immersive gaming content (e.g., a user avatar, other user avatars, three-dimensional virtual objects, two-dimensional panels, different skyboxes and backgrounds, etc.).

Figure 7A:
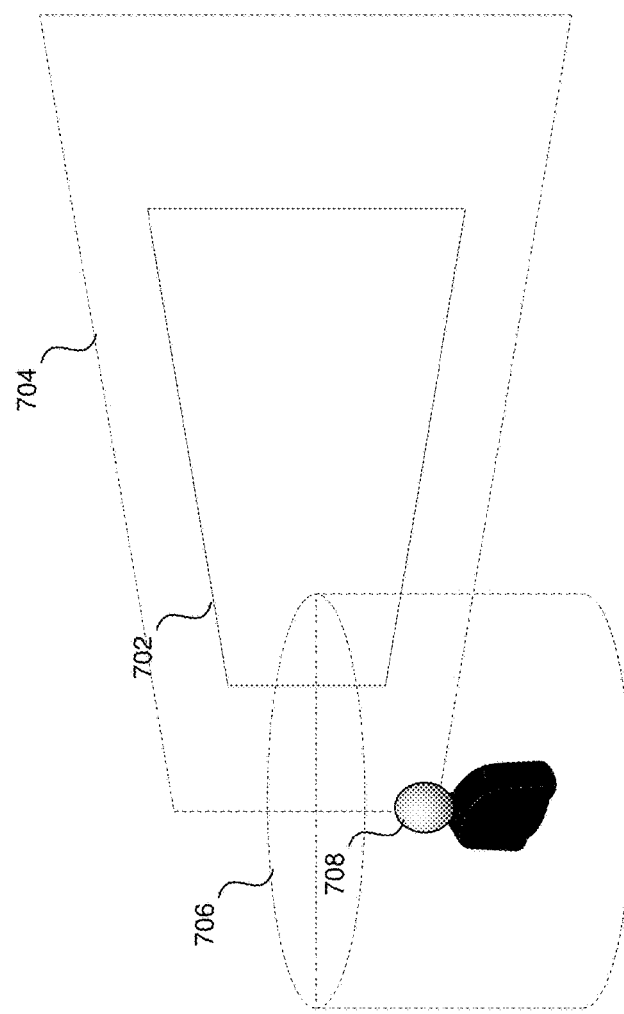
FIG. 7A is a diagram of a three-dimensional environment with a theater display.

Implementations of the three-dimensional environment include a theater screen at a far-field region or volume. FIG. 7A is a diagram of a three-dimensional environment with a theater display. Environment 700 includes theater object 702, far-field 704, near-field 706, and user 708. Far-field 704 can be a cylindrical surface, portion of a cylindrical surface, or any other suitable field that is further from the user than near-field 706. Theater object 702 can be a virtual object assigned to far-field 704 that displays content for an executing application. In some implementations, environment 700 can operate in cooperative mode. For example, theater object 702 can display a video while a user interacts with other executing applications via their corresponding virtual objects.

FIG. 7B is a diagram of a three-dimensional environment illustrating multiple display locations. Diagram 710 illustrates different display locations for near-field displays 712, a far-field display 716, and an exclusive field display 714. Each of near-field displays 712, far-field display 716, and exclusive field display 714 can display content from an executing application, such as in different modes of operation for a system shell. Exclusive field display 714 can be a virtual object that displays content for an application that executes in exclusive mode. Near-field displays 712 can be virtual objects that display content for concurrently executing applications while the system shell operates in cooperative mode. In one or both of exclusive mode or cooperative mode, far-field display 716 can be a theater object that displays application content to a user, such as video content.

Figure 8:
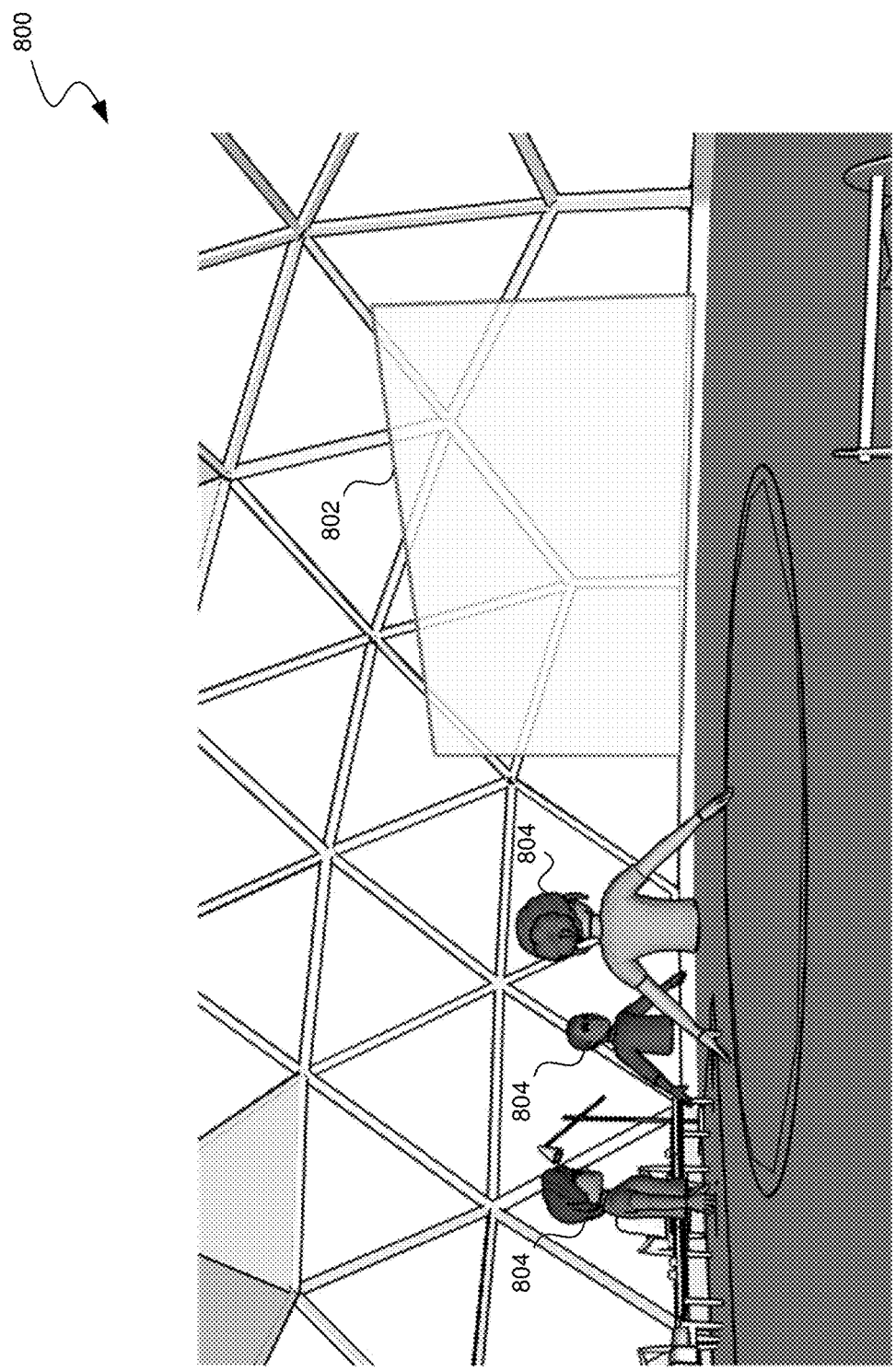
FIG. 8 is a diagram of a shared three-dimensional environment with a theater display.

In some implementations, a theater screen can be shared among multiple users. FIG. 8 is a diagram of a shared three-dimensional environment in theater mode. Environment 800 includes theater object 802 and users 804. Each of users 804 can be displayed a three-dimensional environment by XR systems that comprise theater object 802. For example, a video can be cast to theater object 802 by any participating XR system/system shell, and the video can be simultaneously displayed to users 804 via their XR systems.

Those skilled in the art will appreciate that the components illustrated in FIGS. 1-5, 6A, 6B, 7A, 7B, and 8 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 9:
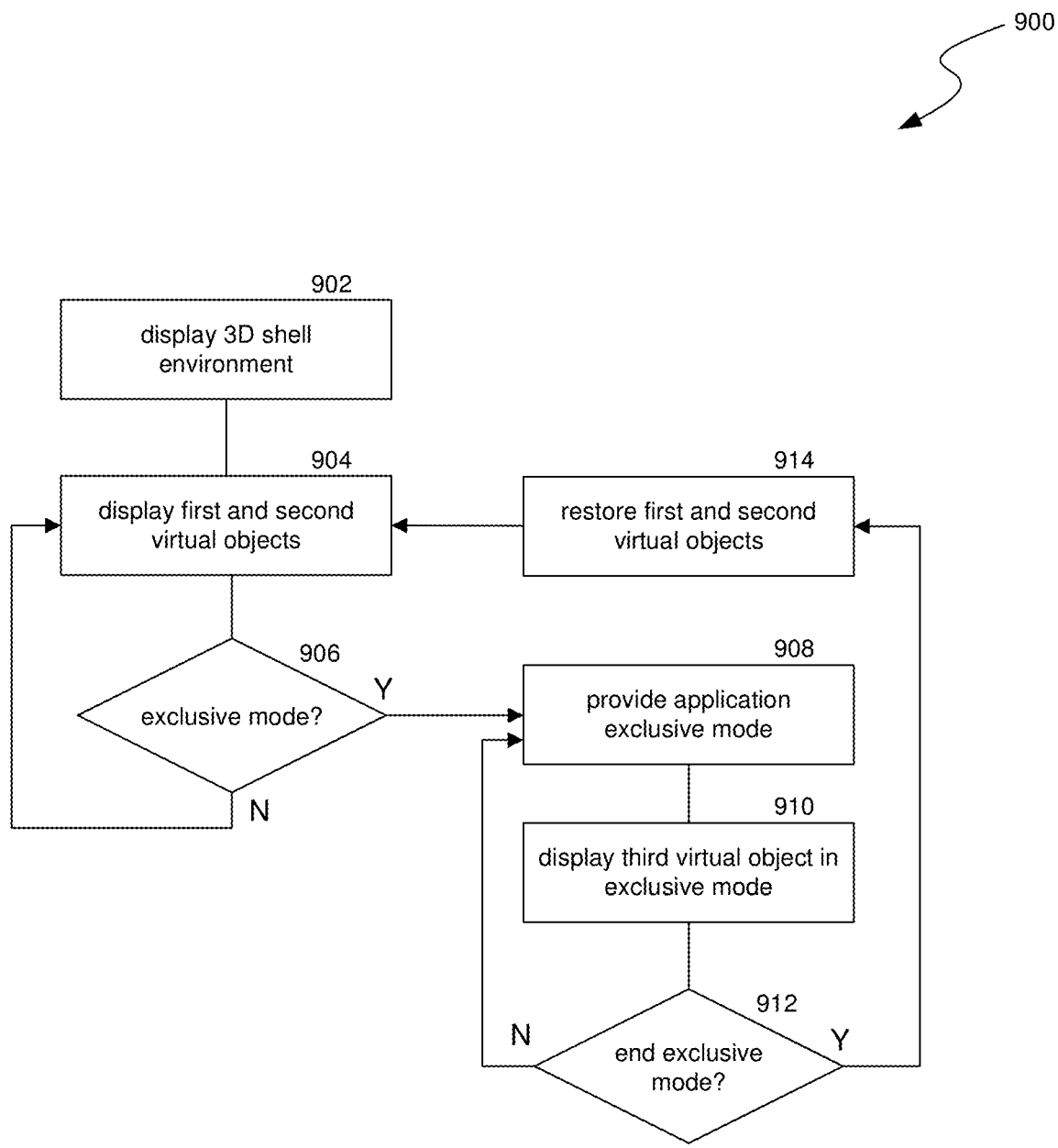
FIG. 9 is a flow diagram illustrating a process used in some implementations of the present technology for application multitasking in a shell with a three-dimensional environment.

FIG. 9 is a flow diagram illustrating a process used in some implementations of the present technology for application multitasking in a shell with a three-dimensional environment. In some implementations, process 900 can be performed by a XR system. In some implementations, process 900 can be triggered when a three-dimensional environment for a system shell is displayed to a user.

At block 902, process 900 can display a three-dimensional environment for a system shell to a user. For example, a XR system can display an immersive three-dimensional environment to a user that includes content (e.g., virtual objects, application content, etc.) for a system shell. In some implementations, the shell XR environment can be displayed to a user via a XR device. In some implementations, a given executing application and/or executing software process can comprise display priority such that the XR device displays content from the priority application/process. In some instances, a shell application can comprise this priority (e.g., in cooperative mode). In other instances, an other executing application can comprise this priority (e.g., when the other application is executing in exclusive mode).

At block 904, process 900 can display first and second virtual objects in the three-dimensional environment. For example, the system shell and three-dimensional environment can operate in a cooperative mode where multiple concurrent applications are executing. The first virtual object can display content for a first executing application and the second virtual object can display content for a second executing application. In some implementations, the first and second virtual objects are displayed at a first distance from the user, such as at a near-field, while the system shell and three-dimensional environment are in cooperative mode.

At block 906, process 900 can detect when an exclusive mode has been initiated for the first application. For example, a user can initiate exclusive mode for the first application, or the first application can request exclusive mode to perform application functionality. In response, the system shell and three-dimensional environment can transition from cooperative mode to exclusive mode. When exclusive mode for an application is initiated, process 900 can progress to block 908. When exclusive mode for an application is not initiated, process 900 can loop back to block 904, where the first and second virtual objects can continue to be displayed in the three-dimensional environment until exclusive mode is initiated.

At block 908, process 900 can provide the first application exclusive mode operation. For example, in exclusive mode, the first application can display any suitable content to the user via the XR device display component (e.g., head-mounted display). In some implementations, the operation in exclusive mode prevents applications, other than the first application, from displaying world-locked content via the XR device. In some implementations, the operation in exclusive mode provides the first application use of at least a designated exclusive region of the XR environment (e.g., the whole viewable area, a field in front of the user, a specified volume taking most of the viewable area, etc).

In some implementations, process 900 can, in exclusive mode, dynamically display a third virtual object in the XR environment (e.g., shell XR environment). For example, the third virtual object can be displayed at a distance from the user that is closer than the first distance, such as in the exclusive region. The third virtual object can be displayed at any other suitable location. The third virtual object can display content for the first application while the application remains in exclusive mode. In some implementations, while in exclusive mode the first virtual object and second virtual object are removed from display in the three-dimensional environment (e.g., shell XR environment).

In some implementations, while operating in exclusive mode, the first application can display, via the XR device, a first application XR environment to the user. For example, prior to exclusive mode (e.g., in cooperative mode), the three-dimensional environment displayed to the user can be a shell XR environment. In exclusive mode, content for the first application can be a first application XR environment, and the XR device can replace the shell XR environment with the first application XR environment. For example, the first application can comprise priority over the shell application relative to the XR device display component when operating in exclusive mode. In some implementations, the first application can comprise an immersive gaming application, and the first application XR environment can comprise immersive gaming content (e.g., avatar(s), virtual object(s), skybox(es), background(s), etc.).

At block 910, process 900 can store, in response to triggering the exclusive mode for the first application, state information for the second executing application and the second virtual object. In some implementations, the second executing application is transitioned to a background (e.g., suspended, minimized, etc.) while the first application operates in exclusive mode. The system shell and second application can save the second application's state at the time it is transitioned to the background. For example, the stored state information can include a content state for the second virtual object and an execution state for the second executing application.

At block 912, process 900 can detect when exclusive mode is terminated. For example, a user can exit exclusive mode for the first application (e.g., via input that transitions from exclusive mode) and/or the first application can request a transition from exclusive mode (e.g., back to cooperative mode). When it is detected that exclusive mode is terminated, process 900 can progress to block 912. When it is not detected that exclusive mode has terminated, process 900 can loop back to block 908, where the third virtual object can continue to be displayed in exclusive mode until exclusive mode is terminated.

At block 914, process 900 can restore the first and second virtual objects. For example, the third virtual object can be removed from display when exclusive mode is terminated and the first and second virtual objects can be redisplayed (e.g., at the first distance from the user). In some implementations, the first virtual object resumes display of the content for the first application while executing in cooperative mode. In some implementations, the second application is transitioned back to executing and its state is restored based on its previously stored state. The second virtual object can display content (e.g., the restored state) of the second application while executing in cooperative mode.

In some implementations, in response to terminating the exclusive mode, the XR device replaces the first application XR environment with the shell XR environment. For example, when the content for the first application comprises a first application XR environment, terminating exclusive mode can include returning to the shell XR environment. In this example, the first and second virtual objects can be restored in the shell XR environment.

In some implementations, redisplaying the second virtual object in the XR environment comprises restoring, using the stored state information, content displayed at the second virtual object and an execution state for the second application. For example, the second application can be restored to the execution state that it was in at the time that exclusive mode was triggered for the first application. In addition, the content displayed at the second virtual object can be restored to the content it displayed at the time that exclusive mode was triggered for the first application. Process 900 can then progress to block 904, where the first and second virtual objects are displayed in cooperative mode in the there-dimension environment for the system shell.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for application multitasking in a shell with a three-dimensional artificial reality (XR) environment, the method comprising:
    displaying, to a user via a XR device, the XR environment comprising a first virtual object that displays content for a first application executing in the shell, and a second virtual object that displays content for a second application executing in the shell;
    triggering, in response to a request, an exclusive mode for the first application, the exclusive mode preventing applications, other than the first application, from displaying world-locked content and providing the first application use of at least a designated exclusive region of the XR environment, wherein, during the exclusive mode, the first and second virtual objects are removed from display, and the second application is transitioned to a background state;
    redisplaying, in response to termination of the exclusive mode, the first virtual object and the second virtual object in the XR environment by:
        transitioning the second application from the background state to executing in the shell; and
        displaying content for the first application executing in the shell at the first virtual object and content for the second application executing in the shell at the second virtual object.

2. The method of claim 1, wherein when displayed or redisplayed, the first virtual object and the second virtual object are displayed side-by-side in a predefined near-field region of the XR environment relative to the user.

3. The method of claim 2, wherein the near-field region of the XR environment comprises a plurality of nodes positioned side-by-side and, when displayed, each of the first virtual object and second virtual object is assigned to one of the nodes.

4. The method of claim 2, wherein, in exclusive mode, content for the first application is dynamically moved to a third virtual object displayed in the exclusive region of the XR environment.

5. The method of claim 4, wherein the exclusive region is closer in proximity to the user than the near-field region in the XR environment.

6. The method of claim 4, wherein the first virtual object, second virtual object, and third virtual object comprise two-dimensional panels.

7. The method of claim 1,
    wherein the XR environment displayed to the user comprises a shell XR environment,
    wherein, in exclusive mode, the content for the first application comprises a first application XR environment,
    wherein, in exclusive mode, the shell XR environment is replaced with the first application XR environment, and
    wherein, in response to terminating the exclusive mode, the first application XR environment is replaced with the shell XR environment.

8. The method of claim 1, further comprising:
    storing, in response to triggering the exclusive mode for the first application, state information for the second executing application and the second virtual object, wherein the redisplaying the second virtual object in the XR environment comprises restoring the second virtual object using the stored state information.

9. The method of claim 8, wherein the stored state information comprises a content state for the second virtual object and an execution state for the second executing application.

10. The method of claim 9, wherein the redisplaying the second virtual object in the XR environment comprises restoring, using the stored state information, content displayed at the second virtual object and an execution state for the second application.

11. A computer-readable storage medium storing instructions that, when executed by a computing system, cause the computing system to perform a process for application multitasking in a shell with a three-dimensional artificial reality (XR) environment, the process comprising:
    displaying the XR environment comprising a first virtual object that displays content for a first application executing in the shell, and a second virtual object that displays content for a second application executing in the shell;
    triggering an exclusive mode for the first application that prevents applications other than the first application from displaying world-locked content, wherein, during the exclusive mode, the first and second virtual objects are removed from display, and the second application is transitioned to a background;
    redisplaying, in response to termination of the exclusive mode, the first and second virtual objects in the XR environment by:
    transitioning the second application from the background to executing in the shell; and
    displaying content for the first application executing in the shell at the first virtual object and content for the second application executing in the shell at the second virtual object.

12. The computer-readable storage medium of claim 11, wherein when displayed or redisplayed, the first virtual object and the second virtual object are displayed side-by-side in a predefined near-field region of the XR environment relative to the user.

13. The computer-readable storage medium of claim 12, wherein the near-field region of the XR environment comprises a plurality of nodes positioned side-by-side, and, when displayed, each of the first virtual object and second virtual object is assigned to one of the nodes.

14. The computer-readable storage medium of claim 12, wherein the triggered exclusive mode for the first application provides the first application use of at least a designated exclusive region of the XR environment, and, in exclusive mode, content for the first application is dynamically moved to a third virtual object displayed in the exclusive region of the XR environment.

15. The computer-readable storage medium of claim 14, wherein the designated exclusive region of the XR environment is closer in proximity to the user than the near-field region in the XR environment.

16. The computer-readable storage medium of claim 14, wherein the first virtual object, second virtual object, and third virtual object comprise two-dimensional panels.

17. The computer-readable storage medium of claim 11,
wherein the XR environment displayed to the user comprises a shell XR environment,
wherein, in exclusive mode, the content for the first application comprises a first application XR environment,
wherein, in exclusive mode, the shell XR environment is replaced with the first application XR environment, and
wherein, in response to terminating the exclusive mode the first application XR environment is replaced with the shell XR environment.

18. The computer-readable storage medium of claim 11, wherein the process further comprises:
storing, in response to triggering the exclusive mode for the first application, state information for the second executing application and the second virtual object, wherein the redisplaying the second virtual object in the XR environment comprises restoring the second virtual object using the stored state information.

19. The computer-readable storage medium of claim 18, wherein the stored state information comprises a content state for the second virtual object and an execution state for the second executing application, and wherein the redisplaying the second virtual object in the XR environment comprises restoring, using the stored state information, content displayed at the second virtual object and an execution state for the second application.

20. A computing system for application multitasking in a shell with a three-dimensional artificial reality (XR) environment, the computing system comprising:
one or more processors; and
one or more memories storing instructions that, when executed by the one or more processors, cause the computing system to perform a process comprising:
displaying, via a XR device, the XR environment comprising a first virtual object that displays content for a first application executing in the shell, and a second virtual object that displays content for a second application executing in the shell;
triggering an exclusive mode for the first application that prevents applications other than the first application from displaying world-locked content, wherein, during the exclusive mode, the first and second virtual objects are removed from display, and the second application is transitioned to a background;
redisplaying, in response to termination of the exclusive mode, the first and second virtual objects in the XR environment by:
transitioning the second application from the background state to executing in the shell; and
displaying content for the first application executing in the shell at the first virtual object and content for the second application executing in the shell at the second virtual object.

* * * * *